(12) United States Patent
Aubry et al.

(10) Patent No.: US 8,929,413 B2
(45) Date of Patent: Jan. 6, 2015

(54) LASER GAIN MODULE AND METHOD FOR PRODUCING SUCH A MODULE

(75) Inventors: Nicolas Aubry, Verdun (FR); Didier Perrodin, Chazay d'Azergues (FR); Julien Didierjean, Caluire et Cuir (FR); Jean-Marie Fourmigue, Bois le Roi (FR); François Balembois, Boissy le Sec (FR); Igor Martial, Bures sur Yvette (FR)

(73) Assignees: Fibercryst, Villeurbanne (FR); CNRS, Paris (FR)

( * ) Notice: Subject to any disclaimer, the term of this patent is extended or adjusted under 35 U.S.C. 154(b) by 0 days.

(21) Appl. No.: 13/994,645

(22) PCT Filed: Dec. 14, 2011

(86) PCT No.: PCT/EP2011/072714
§ 371 (c)(1),
(2), (4) Date: Aug. 22, 2013

(87) PCT Pub. No.: WO2012/080308
PCT Pub. Date: Jun. 21, 2012

(65) Prior Publication Data
US 2013/0336347 A1    Dec. 19, 2013

(30) Foreign Application Priority Data

Dec. 17, 2010    (FR) ..................... 10 60675

(51) Int. Cl.
| H01S 3/04 | (2006.01) |
| H01S 3/042 | (2006.01) |
| H01S 3/02 | (2006.01) |
| H01S 3/06 | (2006.01) |
| H01S 3/08 | (2006.01) |
| H01S 3/0941 | (2006.01) |

(52) U.S. Cl.
CPC ............... *H01S 3/042* (2013.01); *H01S 3/025* (2013.01); *H01S 3/061* (2013.01); *H01S 3/0405* (2013.01); *H01S 3/0407* (2013.01); *H01S 3/0621* (2013.01); *H01S 3/08072* (2013.01); *H01S 3/09415* (2013.01)
USPC .................................. 372/34; 372/41; 372/6

(58) Field of Classification Search
CPC ......... H01S 3/0405; H01S 3/042; H01S 3/04; H01S 3/16; H01S 3/067
USPC .................................................. 372/34, 41, 6
See application file for complete search history.

(56) References Cited

U.S. PATENT DOCUMENTS 4,730,335 A * 3/1988 Clark et al. ..................... 372/98
4,897,850 A     1/1990 Crosby (Continued)

FOREIGN PATENT DOCUMENTS

| DE | 101 39 753 A1 | 3/2003 |
| EP | 0 251 719 A2 | 1/1988 |
| JP | 11-004029 A | 1/1999 |

OTHER PUBLICATIONS

S. Chenais, et al., "On thermal effects in solid-state lasers: The case of ytterbium-doped materials," Progress in Quantum Electronics, vol. 30 (2006), pp. 89-153 (65 pages).

(Continued)

*Primary Examiner* — Kinam Park
(74) *Attorney, Agent, or Firm* — Osha Liang LLP

(57) ABSTRACT

According to one embodiment, the invention relates to a laser gain module (1) comprising: a laser rod (5) having a shaft and two optical interfaces (7, 9) facing each other, the rod (5) being used for longitudinal or quasi-longitudinal optical pumping; and a metal cooling body (3), at least one part of which is molded around the laser rod (5) in order to cover all of the surfaces other than the optical interfaces in such a way that the laser gain module (1) forms a solid body that cannot be disassembled at ambient temperature.

14 Claims, 10 Drawing Sheets

(56) References Cited

U.S. PATENT DOCUMENTS

| | | |
|---|---|---|
| 5,846,638 A | 12/1998 | Meissner |
| 5,949,805 A | 9/1999 | Mordaunt et al. |
| 2007/0201532 A1 | 8/2007 | Zhang et al. |
| 2007/0238219 A1* | 10/2007 | Bennett et al. ............ 438/106 |

OTHER PUBLICATIONS

S.Chenais et al., "Direct and absolute temperature mapping and heat transfer measurements in diode-end-pumped Yb : YAG," Applied Physics B, vol. 79 (2004), pp. 221-224 (4 pages).

J. Dong et al., "Temperature-dependent stimulated emission cross section and concentration quenching in highly doped Nd3+:YAG crystals," Physica Status Solidi. A. Applied Research 202, No. 13 (2005), pp. 2565-2573 (9 pages).

International Search Report issued in PCT/EP2011/072714, mailed on May 25, 2012, with translation (7 pages).

Written Opinion issued in PCT/EP2011/072714, mailed on May 25, 2012 (8 pages).

International Preliminary Report on Patentability issued in PCT/EP2011/072714, mailed on Jan. 10, 2013, with translation (14 pages).

Search Report issued in corresponding French Patent Application No. 1060675, dated Jul. 28, 2011 (2 pages).

* cited by examiner

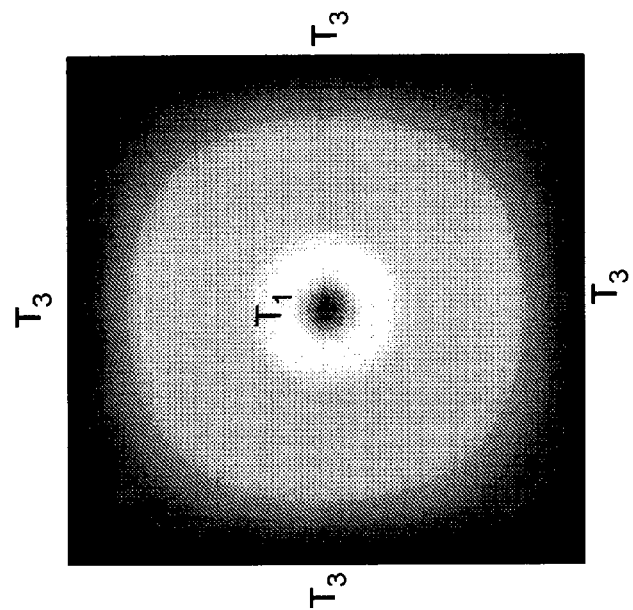
FIG.8A
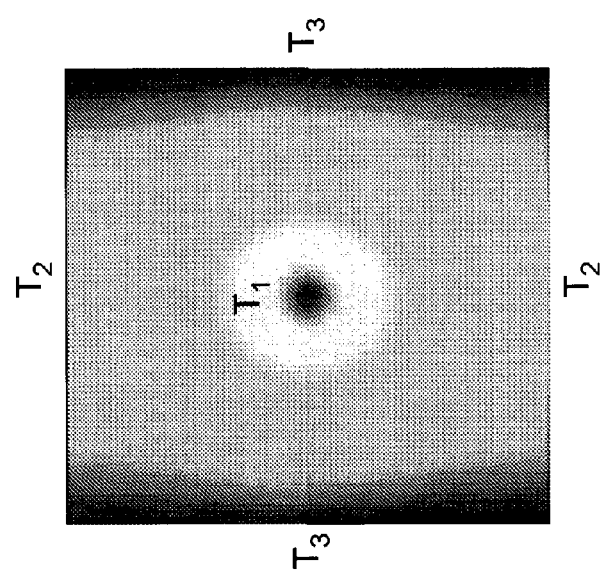
FIG.8B
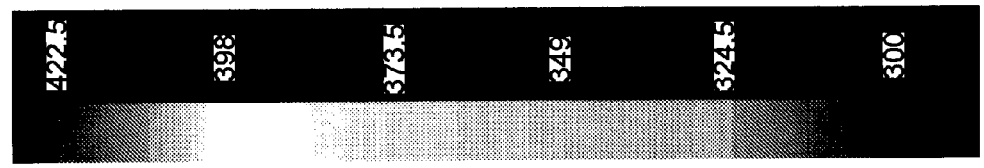

LASER GAIN MODULE AND METHOD FOR PRODUCING SUCH A MODULE

FIELD OF THE INVENTION

The present invention relates to a laser gain module with very good cooling and also to a method of fabricating such a module.

THE PRIOR ART

Optically-pumped solid-state laser systems are known, emitting at very high optical powers, typically several hundreds of Watts of average power, and several Megawatts of peak power. The active media or gain media of these lasers are, for example, crystalline plates or rods pumped by a laser diode. Laser rod generally refers to a solid medium, of oblong shape, capable of exhibiting an optical gain under the effect of a supply of energy, having an optical axis of propagation of the laser signal and two opposing optical interfaces through which the optical axis passes. This medium may be composed of a crystalline, ceramic material or of an amorphous material, containing active dopants (such as for example rare earth ions). The rod can have a round, square, rectangular or other cross section. The laser rods are for example laser crystals, laser ceramics, glass fibers, or crystalline fibers.

The optical pumping can be longitudinal or near-longitudinal; in one or the other of these cases, the pump beam enters the laser rod via one of the optical interfaces through which the optical axis passes. It propagates either along the optical axis of the rod (longitudinal pumping) or with a non-zero angle with respect to the optical axis of the rod (near-longitudinal pumping). The pumping may also be implemented in a transverse direction (or laterally); in this case, the pump beam enters the laser rod via a surface of the rod other than one of the two optical interfaces through which the optical axis passes. In any case, the optical pumping supplies energy which is partially absorbed by the solid gain medium. The medium returns a part of this energy in the form of laser radiation. It also returns a part of it in the form of heat. For example, in an Nd:YAG crystal longitudinally pumped by a laser diode at 808 nm and emitting a laser beam at 1064 nm, around 25% of the absorbed pump power is lost in the form of heat.

The increase in temperature in the medium causes a decrease in its optical and thermal qualities. This is because the emission cross sections and the thermal conductivity of the laser rods tend to decrease with temperature (Jun Dong et al., "Temperature-dependent stimulated emission cross section and concentration quenching in highly doped Nd3+:YAG crystals", Physica status solidi. A. Applied research 202 (2005) p. 2565). It is therefore important to efficiently limit the increase in temperature of the laser rods under the effect of the optical pumping by means of cooling devices.

In order to cool the laser rods, these are generally held in metal mountings, the metal mounting forming with the laser rod a laser gain module. Heat is produced in the pumped region, i.e., the active region of the rod directly traversed by the pumping energy. The thermal conductivity of the rod, which for laser crystals is typically of the order of 5 to 20 $W \cdot m^{-1} \cdot K^{-1}$, allows the existence of a heat flow going from the pumping region toward the edge of the gain medium. In order to evacuate the heat from the rod, a thermal contact between the rod and its metal mounting must be established. The thermal contact is characterized by the heat transfer coefficient, one definition of which is given for example in H. S. Carlslaw, J. C. Jaeger, *"Conduction of heat in solids"*, 2nd edition, Clarendon Press, Oxford, 1986. The heat transfer coefficient (in $W \cdot cm^{-2} \cdot K^{-1}$) between two objects corresponds to the ratio between the heat flow (in $W \cdot cm^{-2}$) going from one of the two objects to the other and the difference in temperature (in K) between them. Typically, the heat transfer coefficient measured in laser gain modules of the prior art is of the order of 1 $W \cdot cm^{-2} \cdot K^{-1}$ and does not exceed 4 $W \cdot cm^{-2} \cdot K^{-1}$. The heat is subsequently conducted toward a heat extractor or a water cooling system by virtue of the metal mounting, whose thermal conductivity is generally very high (around 100 to 400 $W \cdot m^{-1} \cdot K^{-1}$). The heat is thus dissipated toward the outside.

Many cooling systems are based on a mechanical pressure of the cooling system onto the laser rod which provides the thermal contact between the two. This pressure inflicts mechanical stresses on the rod. These stresses can lead, optically, to de-polarization effects. These stresses are present even in the absence of optical pumping but, during the optical pumping, the increase in temperature causes a deformation of the rod (an expansion in the majority of cases) which accentuates the mechanical stresses to which the rod is subjected, and can cause internal fracturing.

The thermal contact between the cooling system and the laser rod is generally improved by the use of intermediate media such as thermal greases, indium or graphite sheets pressed between the mounting and the rod (see for example S. Chenais et al., "Direct and absolute temperature mapping and heat transfer measurements in diode-end-pumped Yb:YAG", Appl. Phys. B 79 (2004), p. 221), or alternatively adhesive layers (see for example U.S. Pat. No. 5,949,805). It is also possible to fix an optically inactive crystal having a high thermal conductivity to the laser rod by a special bonding technique (see for example U.S. Pat. No. 5,846,638). Nevertheless, these intermediate media pose various problems. Thermal greases and adhesive layers may suffer from degassing phenomena, thus releasing pollutants. Furthermore, they are susceptible to rapid aging implying a regular maintenance of the lasers. This renders their use very difficult in industrial laser systems demanding a high level of cleanliness and a reduced maintenance. In order to make efficient use of indium or graphite sheets, a high pressure needs to be exerted on the solid gain medium so as to squash the layer of indium or graphite and to expunge the air between the mounting, the sheet and the solid gain medium (one concrete example of this is given in S. Chenais et al., "On thermal effects in solid-state lasers: The case of ytterbium-doped materials", Progress in Quantum Electronics 30 (2006) p. 89). This implies that the laser rod is subjected to significant mechanical stresses, which can lead to the occurrence of optical losses by birefringence and fracturing within the rod. Moreover, the sheets are very poorly adapted to rods with a round cross section or with multiples facets. The deposition of an optically inactive crystal between the metal mounting and the active medium by bonding is generally very costly and requires several complex fabrication steps.

By way of exemplary embodiment of the prior art, FIG. 1 reproduces a figure from the patent U.S. Pat. No. 5,949,805 describing a solid-state laser system comprising a rod as solid gain medium, laterally pumped by an array of diodes. In this example, the gain medium 101 is fixed into a heat conductor metal assembly 102, 103 for evacuating the heat generated by pumping diodes 104. The gain medium is fixed to the metal assembly by means of a heat-conductive adhesive layer (not shown).

Aside from the problems already mentioned associated with the use of an adhesive layer, this type of cooling has the drawback of not exhibiting any radial symmetry with respect to the optical axis of the rod. Indeed, under the effect of the optical pumping and of the heating, a thermal lens may be created within the active medium. This lens, induced by the temperature gradients within the rod between the pumped region and the non-pumped regions, can cause a deformation of the emitted laser beams (see, for example, S. Chenais et al., "On thermal effects in solid-state lasers: The case of ytterbium-doped materials", Progress in Quantum Electronics 30 (2006) p. 89). If the cooling of the laser rod exhibits a good radial symmetry with respect to the optical axis, this lens will not generally be very aberrant and will be easily correctable. If the cooling of the laser rod is not uniform, the resulting thermal lens will be aberrant, leading to a greater deformation of the signal beam which is more difficult to correct.

One aim of the present invention consists in providing a laser gain module which exhibits a very good heat dissipation, notably by virtue of a uniform cooling, without subjecting the laser rod to mechanical stresses, so as to avoid optical losses induced by de-polarization and deterioration of the laser beam. Another aim of the invention is to provide a laser gain module having a very good resistance to aging and to wear.

SUMMARY OF THE INVENTION

According to a first aspect, the invention relates to a laser gain module comprising a laser rod with two optical interfaces arranged opposing one another, the rod being intended to undergo a longitudinal or near-longitudinal optical pumping. The laser gain module also comprises a metal cooling body at least a part of which is molded around the laser rod in order to cover all of the surfaces other than the optical interfaces in such a manner that the laser gain module forms a non-removable solid block at room temperature. The laser gain module thus obtained exhibits an excellent heat dissipation, being uniform owing to a cooling applied over all of the non-optical surfaces. The laser gain module thus formed allows the rod to be held efficiently by exerting a mechanical pressure that is much lower than that exerted by the mountings using a mechanical clamping. Moreover, it contains no organic substance (glue, grease, adhesive) likely to degas and to be susceptible to rapid aging.

According to a first preferred embodiment of the invention, the cooling body comprises a metal internal part molded around the laser rod, and a metal external part (or mounting) in contact with the internal part.

According to one variant, the internal part of the cooling body is formed by a metal material whose melting point is lower than that of the metal material from which the external part is formed. The metal materials can be metals or alloys. In the case of alloys, the term "melting point" will be used to describe the temperature of solidus of the alloy, being the limit of temperature below which only solid subsists.

For example, the internal part of the cooling body is an alloy composed mainly of tin and the external part of the cooling body is a metallic compound containing copper, iron, zinc, aluminum, silver, gold, platinum or tin.

According to one variant, the laser gain module comprises a metal adhesion layer between the internal part of the cooling body and the laser rod, allowing the adhesion of the metal material to be facilitated during the molding around the rod.

According to a second preferred embodiment of the invention, the cooling body is formed from a single metal part molded around the laser rod.

For example, the metal material from which the cooling body is formed is a metallic compound containing copper, iron, zinc, aluminum, silver, gold, platinum or tin.

According to one variant of the invention, the laser rod has a cylindrical shape, the cylindrical shape being particularly well adapted to the geometry of optical beams (pump and laser) which typically have a symmetry of revolution.

For example, the laser rod is a crystal fiber.

According to variants of the first aspect of the invention, the laser rod is a crystal or a ceramic of the type oxide (for example YAG), vanadate (for example $YVO_4$), fluoride (for example $CaF_2$), or tungstate (for example KYW), or a silica based glass. This rod is for example doped with rare earth ions such as $Nd^{3+}$, $Yb^{3+}$ or $Er^{3+}$.

According to one variant, the optical interfaces form a defined angle with the axis of the laser rod, for example between 50° and 70°, corresponding to the Brewster angle of the laser material in question. The Brewster angle inclination of the optical interfaces with respect to the optical axis allows the Fresnel losses suffered by polarized optical beams to be limited without using dielectric layers.

According to another variant, the optical interfaces of the laser rod comprise a dielectric coating, this coating allowing the Fresnel losses on the optical interfaces to be limited or allowing them to act as a mirror.

According to one variant, the cooling body is structured for the circulation of a cooling fluid.

According to a second aspect, the invention relates to a laser gain element comprising a laser gain module according to the first aspect, and a cooling block fixed to the laser gain module and structured for the circulation of a cooling fluid. The cooling block allows the heat to be evacuated toward the outside. It comprises for example fins for air cooling, or a flow circuit for a liquid coolant.

According to a third aspect, the invention relates to a solid-state laser system comprising a laser gain module according to the first aspect or a laser gain element according to the second aspect.

According to one variant, the solid-state laser system further comprises a source for emission of a pump beam designed for the longitudinal or near-longitudinal pumping of the laser rod, together with reflecting elements disposed on each side of the laser gain module (or of the laser gain element) in order to form a cavity, the whole assembly thus forming a laser oscillator.

According to one variant, the solid-state laser system further comprises a laser source and optical elements so as to form an amplified laser system or MOPA, abbreviation for the expression "Master Oscillator Power Amplifier".

According to a fourth aspect, the invention relates to a method for fabricating a laser gain module. Said method comprises bringing into contact a laser rod with a metal compound; heating the rod-metal compound assembly to a temperature equal to at least the melting point of the metal compound, allowing the metal compound to mold itself all around the laser rod; cooling the rod-metal compound assembly to a temperature lower than the melting point of the metal compound in order to form a non-removable block at room temperature; and cutting and polishing the rod-metal compound assembly so as to form two optical interfaces arranged opposing one another, all of the surfaces other than the optical interfaces being covered by the metal compound.

According to one variant, the metal compound with which the laser rod is brought into contact is solid and the heating of the rod-metal compound assembly allows the, at least partial, liquefaction of the metal compound and the molding of the compound thus liquefied around the rod.

According to another variant, the metal compound with which the laser rod is brought into contact is liquid or partially liquid and the heating of the rod-metal compound assembly allows the metal compound to remain in liquid form and to then mold itself around the rod.

According to a first preferred embodiment of the invention, the fabrication method according to the fourth aspect comprises the deposition of the laser rod into a notch of a cooling body made of metal material before bringing it into contact with the metal compound, the metal compound having a melting point lower than that of the material from which the cooling body is formed.

According to one variant of the first embodiment, the fabrication method further comprises, prior to bringing it into contact with the metal compound, the coating of all of the surfaces other than the optical interfaces of the laser rod with a metallic paint allowing the adhesion of the metal compound in the form of a liquid, and the drying of the metallic paint deposited onto the laser rod in order to obtain a metal adhesion layer around the laser rod.

According to another variant, when an oxide layer appears on the metal adhesion layer, the fabrication method further comprises the cleaning of the oxide layer.

According to a second preferred embodiment of the invention, the fabrication method according to the fourth aspect comprises the deposition of the laser rod into a crucible prior to bringing it into contact with the metal compound, the heating of the crucible containing the rod-metal compound assembly to a temperature at least equal to the melting point of the metal compound, and the de-molding of the rod-metal compound assembly after cooling.

For example, the crucible is made of graphite so as to facilitate de-molding of the assembly formed by the laser rod and the metal compound.

According to variants, the metal compound takes the form of a powder, of rods or of chips.

According to one variant of the second embodiment, the heating step is carried out in a chamber under a controlled atmosphere in order to prevent the oxidation of the metal compound during the heating step.

According to one variant, the cutting of the rod-metal compound assembly is carried out according to the Brewster angle of the material from which the laser rod is formed.

According to one variant, the fabrication method further comprises the application of a dielectric coating onto at least one of the optical interfaces of the laser rod.

BRIEF DESCRIPTION OF THE FIGURES

Other features and advantages of the invention will become apparent upon reading the description that follows, illustrated by the figures in which:

FIGS. 8A and 8B show the calculated temperature distribution in a laser gain module containing a crystal with a square cross section, in the case of cooling via two sides and via four sides.

DETAILED DESCRIPTION

Figure 1:
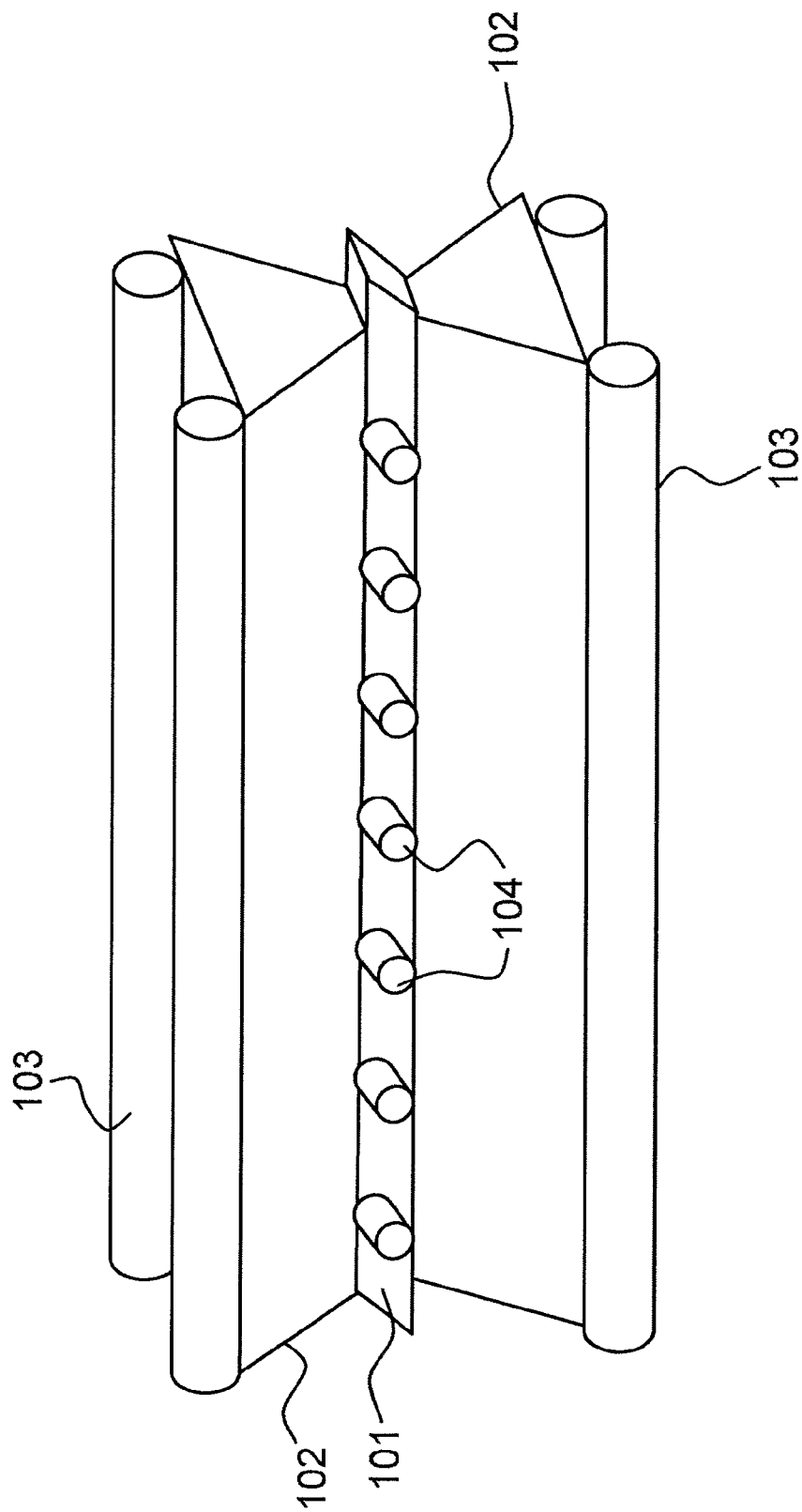
FIG. 1 shows a known laser system comprising a laser rod as active medium.
Figure 2:
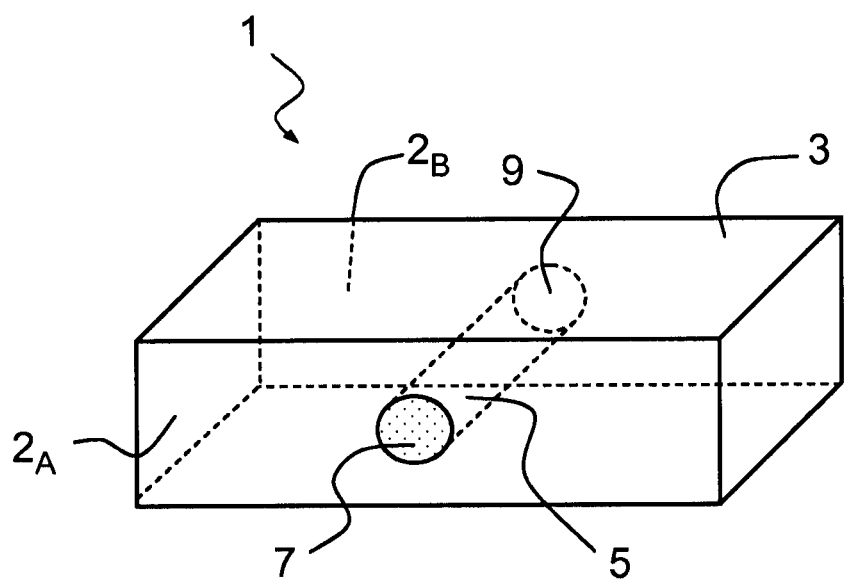
FIG. 2 shows a diagram of a laser gain module according to a first embodiment of the invention.
Figure 3:
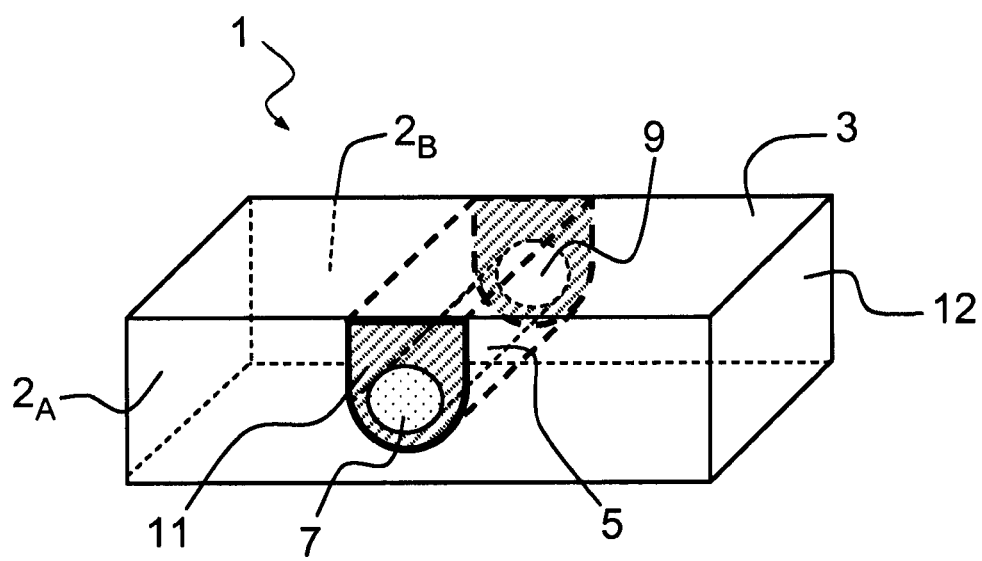
FIG. 3 shows a diagram of a laser gain module according to a second embodiment of the invention.

FIGS. 2 and 3 show schematic views of a laser gain module according to two embodiments of the invention. The gain module 1 comprises a laser rod 5 together with a metal mounting 3 holding the rod. The metal mounting 3 serves as a cooling body for the laser rod 5, allowing the heat produced in the rod and due to the optical pumping to be evacuated. The rod has two ends 7, 9. These ends are polished surfaces which form optical interfaces. The laser rod 5 is intended for a longitudinal or near-longitudinal optical pumping by a pump beam incident on one and/or the other of the optical interfaces 7,9. Advantageously, the rod has an axis of symmetry, and the pumping can be applied substantially along the axis of symmetry of the rod. For example, the rod is substantially cylindrical, the axis of the cylinder coinciding with the optical axis. The optical interfaces are not covered by the metal mounting 3. The optical interfaces 7, 9 are entry and/or exit faces for the pump beam and for the laser beam. The optical interfaces 7, 9 may, furthermore, be coated with thin films possessing an optical function (typically antireflection or highly-reflective mirror) for chosen wavelengths. The surfaces of the rod 5 other than the optical interfaces are totally covered by the cooling body 3 allowing a perfectly uniform evacuation of the heat.

FIG. 2 illustrates a first embodiment. In this example, the metal mounting, or cooling body 3, is formed as a single part molded around the rod 5; it is advantageously in direct contact with the surfaces other than the optical interfaces. Thus, the whole of the laser rod 5, except for the optical interfaces 7, 9, is covered by the cooling body 3. Advantageously, the cooling body has the general shape of a parallelepiped, with two opposing faces $2_A$, $2_B$ through which the laser rod 5 is exposed, in such a manner that the optical interfaces 7, 9 are in the same plane as said faces $2_A$, $2_B$ of the cooling body, typically to the nearest few microns. The surface area of the laser rod which would not be in contact with the cooling body is thus very limited, or even zero. In the example in FIG. 2, said faces of the cooling body through which the laser rod is exposed are parallel, substantially perpendicular to the optical axis of the laser rod. Alternatively, these faces may be inclined with respect to the optical axis of the rod, the optical interfaces remaining substantially in the same plane as said faces. The laser gain module 1 thus forms a non-removable solid block at room temperature.

In the example in FIG. 3, a laser gain module according to a second embodiment of the invention is illustrated. The cooling body 3 is formed in two parts, an internal part 11 and an external part 12 in contact with the internal part. The internal part 11 of the cooling body 3 is formed from a metal material whose melting point (or temperature of solidus in the case of an alloy) is lower than that of the metal material from which the external part 12 is formed. The whole laser rod 5, in this example, is covered by the internal part 11 of the cooling body 3, except for the optical interfaces 7, 9. The laser gain module 1 thus produced forms a non-removable block, and has for example the shape of a parallelepiped with, as in the example in FIG. 2, two opposing faces $2_A$, $2_B$ through which the laser rod is exposed. The optical interfaces 7, 9 are, as in the first embodiment, in the same plane as said faces of the cooling body through which the laser rod is exposed. These faces can be parallel to each other, and substantially perpendicular to the optical axis of the rod, or present an angle of inclination with respect to the optical axis of the rod.

In the embodiments shown in FIGS. 2 and 3, the material from which the part of the cooling body 3 designed to be molded around the laser rod 5 is formed has a melting point lower than that of the laser rod. It can, for example, be of the order of 200° C. to 600° C. The cooling body 3 of the first embodiment and the external part 12 of the second embodiment can, for example, be made from a material containing copper, aluminum, iron, zinc, silver, gold, platinum or tin, or any other material having a good thermal conductivity, in other words typically greater than 100 $W \cdot m^{-1} \cdot K^{-1}$. The internal part 11 of the cooling body 3 of the second embodiment may, for example, be formed by a brazing material, for example silver, or a mixture containing tin and silver, or any other metal compound having a good thermal conductivity and whose melting point is lower than that of the material forming the external part 12.

The cooling body can, furthermore, be structured for the circulation of a cooling fluid. For example, conduits for a liquid coolant or metal fins allowing dissipation of the heat by air may be provided on the cooling body.

The laser rod 5 can, for example, be composed of a crystalline material, such as an oxide (for example YAG), a vanadate (for example $YVO_4$), a fluoride (for example $CaF_2$) or a tungstate (for example KYW). The crystal can be doped with rare earth ions or metal ions, such as $Nd^{3+}$, $Yb^{3+}$, $Er^{3+}$, $Tm^{3+}$, or $Ho^{3+}$.

As explained with reference to FIGS. 2 and 3, the optical interfaces 7, 9 of the rod 5 may be perpendicular to the optical axis, or biased with respect to the latter. For example, the optical interfaces may be cut according to the Brewster angle of the material composing the rod, thus allowing the Fresnel losses of the polarized optical beams entering or exiting the rod to be limited. The optical interfaces can also be polished in a spherical or aspherical fashion in order to modify the divergence of the optical beams. The laser rod can have various shapes. The maximum dimension of the cross section of the rod can for example vary from a few tens of micrometers to several centimeters, and the length of the rod, for example, from a few millimeters to several tens of centimeters. In particular, the laser rod can take the form of a crystal fiber with a circular cross section, the crystal fiber (with a typical diameter of 1 millimeter) allowing optical radiation to be guided in a longitudinal direction by total internal reflections.

Owing to the fact that the cooling body covers all the surfaces other than the optical interfaces of the laser rod, a uniform cooling of the whole of the rod can be obtained. Notably, the heat transfer coefficient is uniform over all the cooled surfaces of the rod. By choosing as metal material in direct contact with the laser rod a material having a very good thermal conductivity (around 100 to 400 $W \cdot m^{-1} \cdot K^{-1}$), the efficiency of evacuation of the heat produced by the pumping in the rod can be optimized. Thus, it is possible to use higher pumping powers (of the order of 200 to 500 W instead of 30-40 W in known systems) in order to obtain laser radiation at a very high power (of around 100 W in average power, and of several Megawatts in peak power). Since the laser gain module does not comprise any components susceptible to degassing and to rapid aging, it has an estimated lifetime of several tens of years. In particular, the module does not age over the timescale of lifetime of a laser system into which it may be integrated (see hereinbelow). In addition, the laser gain module according to the embodiments described constitutes, mechanically, a non-removable block. This advantageously allows any misalignment of the position of the laser rod during its assembly to be avoided, the module exhibiting at the same time a very good resistance to mechanical impacts. Lastly, the laser gain module described allows the mechanical stresses to which the laser rod is subjected to be greatly reduced with respect to the mountings using a mechanical pressure on the rod so as to ensure a good thermal contact.

Methods for fabricating a laser gain module according to embodiments of the invention are described hereinbelow.

Figure 4:
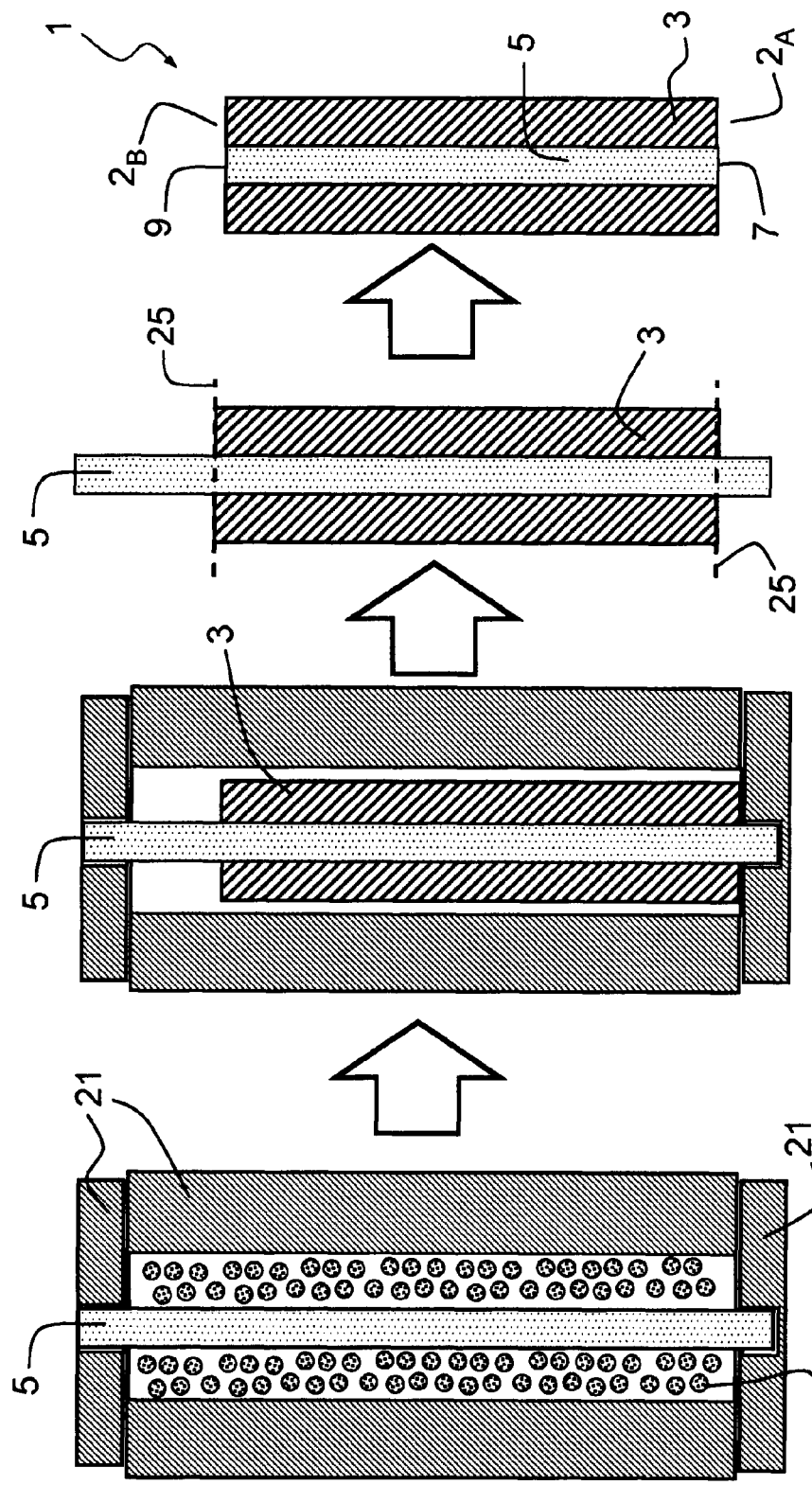
FIG. 4 illustrates one example of a method for fabricating the laser gain module according to one embodiment of the invention.

According to one embodiment illustrated in FIG. 4, a laser gain module is fabricated by a molding process. As a first step, a laser rod 5 is put into a crucible or mold 21 in such a manner that it is held in the crucible by its ends. The crucible 21 is subsequently filled (FIG. 4A) with a metal molding compound 23 (metal or metal alloy) in solid form, for example in the form of chips, rods or powder, or in liquid form (molten metal). The ends of the rod 5 are not in contact with the metal molding compound 23. The crucible 21 is then heated to a temperature at least equal to the melting point of the metal molding compound. More precisely, when the metal compound is a pure metal, the crucible is heated to a temperature greater than the melting point of the metal (but lower than the melting point of the crucible). If it is an alloy, the crucible is heated to a temperature greater than the temperature of solidus of the alloy, such that the metal molding compound is at least partially liquid and remains liquid for the time needed to be able to mold itself perfectly around the rod. The heating temperature of the crucible is, for example, around 600° C. to 1000° C. The crucible, on the other hand, is made of a material whose melting point is greater than that of the metal molding compound and to which the molten metal molding compound does not adhere. For example, the crucible is made of vitreous carbon. The molding process may be carried out in a chamber placed under a controlled atmosphere in order to avoid the oxidation of the metal molding compound at high temperature. The crucible is maintained at temperature for the time needed, typically a few minutes, to ensure the liquefaction— at least partial—or the maintenance in liquid form of the molding metal 23 and its molding around the laser rod 5. It is possible to deposit a metal adhesion layer onto the laser rod in order to facilitate the adhesion of the metal compound onto the rod. The crucible thus filled is subsequently cooled to room temperature (FIG. 4B), allowing the metal molding compound to solidify and to form a cooling body 3 directly molded around the rod 5. While cooling, the metal molding compound stuck to the laser rod sees its volume decrease, the rod-metal assembly thus formed being accordingly able to be easily de-molded from the crucible (FIG. 4C). Once removed from the crucible, the rod-metal assembly is cut up (FIG. 4D) in such a manner that the surfaces 7, 9 on the end of the laser rod 5 are located in the same plane as the surfaces $2_A$, $2_B$ of the cooling body through which the laser rod comes out. The module thus obtained forms a non-removable block at room temperature. The surfaces of the ends of the rod are then subjected to an optical polishing in order to obtain optical interfaces 7, 9 arranged opposing one another on either side of the rod 5. The shape of the module obtained by this method depends on the shape of the crucible used. For example, it is possible to obtain a module in the shape of a parallelepiped or cylinder by using a suitably-shaped mold.

Figure 5:
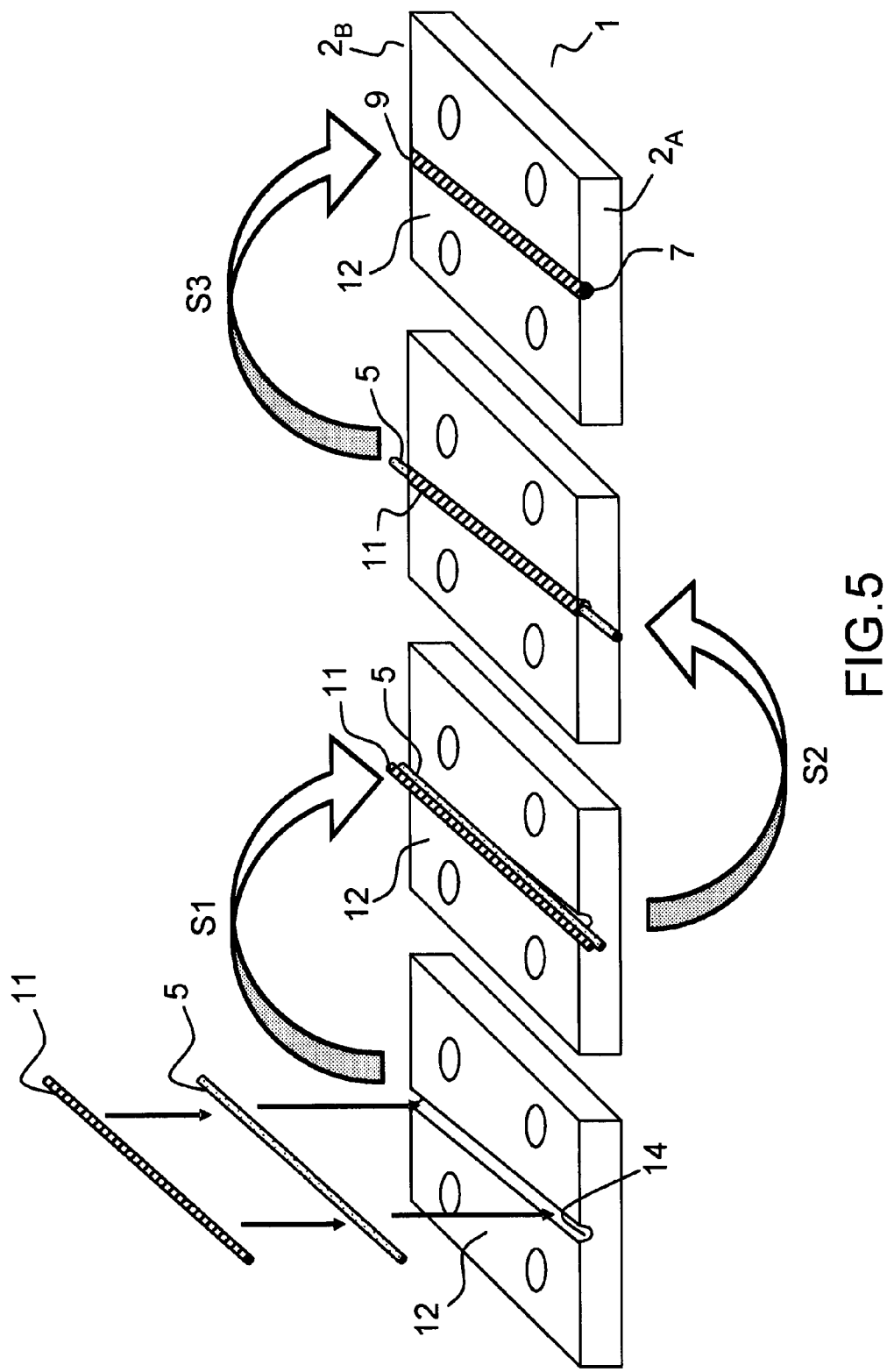
FIG. 5 illustrates one example of a method for fabricating the laser gain module according to another embodiment of the invention.

Another embodiment of a method for fabricating a laser module according to the invention is shown in FIG. 5. A laser rod 5 is placed in a notch 14 of a mounting 12 formed from a metal compound. Preferably, the rod protrudes slightly from the mounting 12 in length. Subsequently, a metal brazing material 11 in solid or liquid form is brought into contact with the rod within the notch (step S1). The brazing material may, for example, take the form of a metal soldering wire. The rod-metal assembly is heated to a temperature at least equal to the melting point of the brazing material. The liquefied brazing metal compound then surrounds the rod over the whole surface in contact with the brazing metal compound (step S2). Preferably, during this step, the rod is maintained at the bottom of the notch in order to avoid it floating on top of the liquid metal compound. The rod-metal assembly is subsequently cooled in order to allow the brazing metal compound to solidify around the rod and in the notch. The assembly is cut up in such a manner that the surfaces of the ends of the laser rod are located in the same plane as the faces $2_A$, $2_B$ of the metal mounting 12, typically to within a few microns, thus ensuring that all of the surfaces other than the optical interfaces are covered by the cooling body (step S3). The laser gain module 1 thus obtained forms a non-removable block at room temperature. The surfaces of the ends of the rod may be subjected to an optical polishing in order to obtain optical interfaces arranged opposing one another.

According to one variant, prior to bringing the laser rod into contact with the brazing metal material, the rod may undergo one or more preparation steps. For example, the rod may have been initially coated with a metallic paint containing metal particles chosen to allow the adhesion of the brazing material. The coated rod is heated in an oven to several hundred degrees in order to dry the paint, leaving a thin metal adhesion layer around the rod. It may be necessary to clean the rod coated with the adhesion layer of a potential oxide layer which might have been formed during the drying of the paint. The rod can then be covered with a protective paste over the surfaces which are not intended to be covered by the brazing metal compound. Thus, it is possible to directly use a laser rod having polished optical interfaces. The laser rod thus prepared is brought into contact with the brazing metal material (step S1).

According to one variant, in order to prevent the oxidation of the brazing metal compound at high temperature, a stripping gel adapted to brazing may also be deposited into the notch prior to heating. Tinning within the notch in the mounting 12, prior to positioning the laser rod, may help to correctly spread the brazing material around the rod.

The laser rod may take a large number of shapes and dimensions. For example, the rod can have a circular, square, rectangular or polygonal cross section.

In the two embodiments of a method for producing a laser gain module described hereinabove, the liquefied metal compound can perfectly adapt itself to the shape and to the asperities of the laser rod. Thus, an optimum mechanical adaptation between the rod and the metal compound surrounding it may be achieved. Once the metal compound has solidified, it keeps a very good direct contact with the rod, which also allows a very good thermal contact between these two media to be obtained. For example, for a cylindrical laser rod made of Nd:YAG of 1 mm in diameter and of 50 mm in length, and a copper cooling body, a heat transfer coefficient greater than 5 $W \cdot cm^{-2} \cdot K^{-1}$ is obtained. In addition, thanks to the methods described, the mechanical stresses exerted on the laser rod are minimized.

Figure 6A:
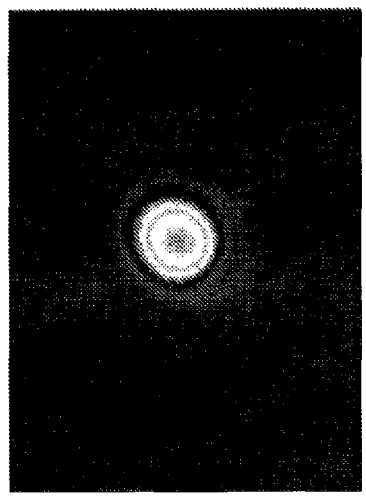
FIGS. 6A to 6D show laser beam images obtained experimentally between parallel or crossed polarizers, in a module according to the prior art and in a module according to the invention.
Figure 6D:
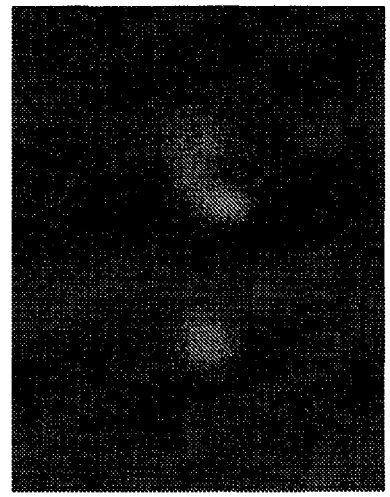
Figure 6C:
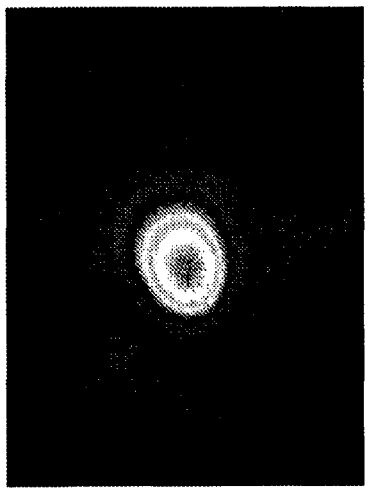
Figure 6B:
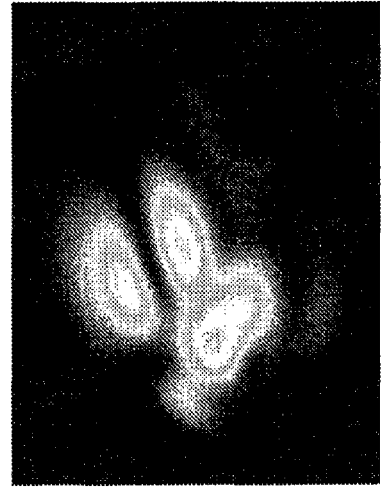

FIGS. 6A to 6D show the transmission figures obtained after double passage of a Gaussian beam at 1064 nm in a crystal fiber of Nd:YAG with a diameter of 1 mm and a length of 50 mm placed between a polarizer and an analyzer, without optical pumping. FIGS. 6A and 6B show the transmission figures obtained in the case of a crystal fiber held by pressure between 2 plates of copper squeezed together by screws, with a groove adapted to the shape of the fiber, in the case where the polarizer and the analyzer are parallel (6A) and in the case where they are crossed (6B). FIGS. 6C and 6D show the same figures in the case where the crystal fiber Nd:YAG is installed in a module according to the invention. In the case where the crystal fiber is held by mechanical pressure between two plates of copper, a slight deformation of the transmitted beam is observed between parallel polarizers and analyzers (FIG. 6A). Between crossed polarizers and analyzers (FIG. 6B), a transmission of around 15% and a transmission figure which is characteristic of losses by de-polarization, caused by a localized birefringence effect, itself induced by mechanical stresses, is observed. In the case of the crystal fiber arranged in a laser gain module according to the invention, a very good transmission of the Gaussian beam after the double passage is observed between parallel polarizers and analyzers (FIG. 6C). Between crossed polarizers and analyzers (FIG. 6D), an extremely low transmission (lower than 1%) and a virtually empty transmission figure is observed, demonstrating the absence of de-polarization effects in the crystal fiber.

These experimental results highlight a significant reduction in the mechanical stresses to which the laser rods are subjected in a laser gain module according to the invention in comparison with conventional cooling methods, in which the thermal contact is established by applying a pressure on the laser rod against its cooling element.

Figure 7:
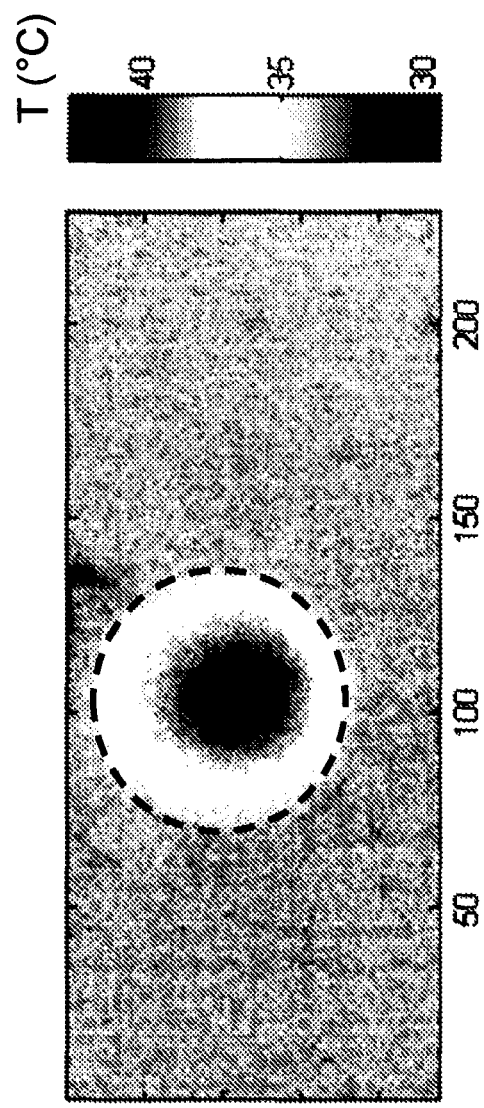
FIG. 7 shows an image obtained by thermal camera of the pumped face of a Nd:YAG crystal fiber arranged in a laser gain module according to the invention.

FIG. 7 furthermore shows an image obtained by a thermal camera of the pumped face of a crystal fiber of Nd:YAG with a diameter of 1 mm, a length of 50 mm, a doping of 0.20% at., receiving 70 W of pump from a laser diode emitting at 808 nm. The excellent radial symmetry of the cooling obtained is to be noted, which is proof of the uniformity of the thermal contact obtained, and also of the absence of a difference between the temperature of the edge of the laser rod and the temperature of the copper mounting, which is proof of a high heat transfer coefficient (estimated at 5 $W \cdot cm^{-2} \cdot K^{-1}$).

FIGS. 8A and 8B show the results of a simulation by finite elements of the temperature in a crystal of Yb:YAG. A simulation is done of a Yb:YAG crystal, pumped longitudinally by a fiber laser diode with a numerical aperture of 0.2, a power of 200 W, focused to a depth of 0.5 mm in the crystal, with a beam diameter of 300 μm at the focal point. The crystal has a cross section of 3×3 mm and is 15 mm in length, with a doping of 2.5% at. FIG. 8A shows a crystal radially cooled on only two sides (temperature $T_3$), the other sides not being cooled (temperature $T_2$). The simulation considers an ideal cooling, in other words a thermal resistance of zero between the crystal and the cooling element on the cooled surfaces. The images show the pumped face of the crystal, seen face on. A significant difference in temperature is noted between the cooled faces and the uncooled faces (a difference of 30 Kelvin), for a maximum temperature of 422 K at the center (temperature $T_1$) of the pumped face of the crystal. In addition, the profile of the thermal lens can be extracted from these simulations. It is thus calculated that the crystal is equivalent to a lens with a focal length of 100 mm along the cooled axis, whereas it is equivalent to a lens with a focal length of 90 mm along the uncooled axis. A strong astigmatism of the thermal lens is therefore observed. In the case in FIG. 8B, where all of the sides are cooled (temperature $T_3$), a thermal lens of around 120 mm is measured, equal along the two axes, with a maximum temperature $T_1$ of 408 K at the center of the pumped face of the crystal. The thermal lens obtained does not exhibit any aberrations.

Figure 9A:
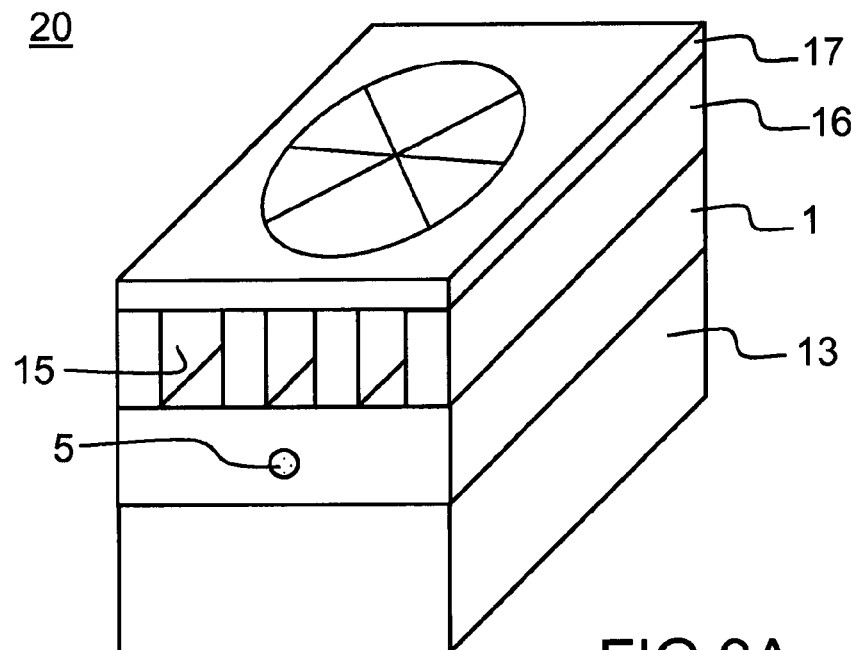
FIGS. 9A and 9B show laser gain elements comprising a laser gain module according to two variants.
Figure 9B:
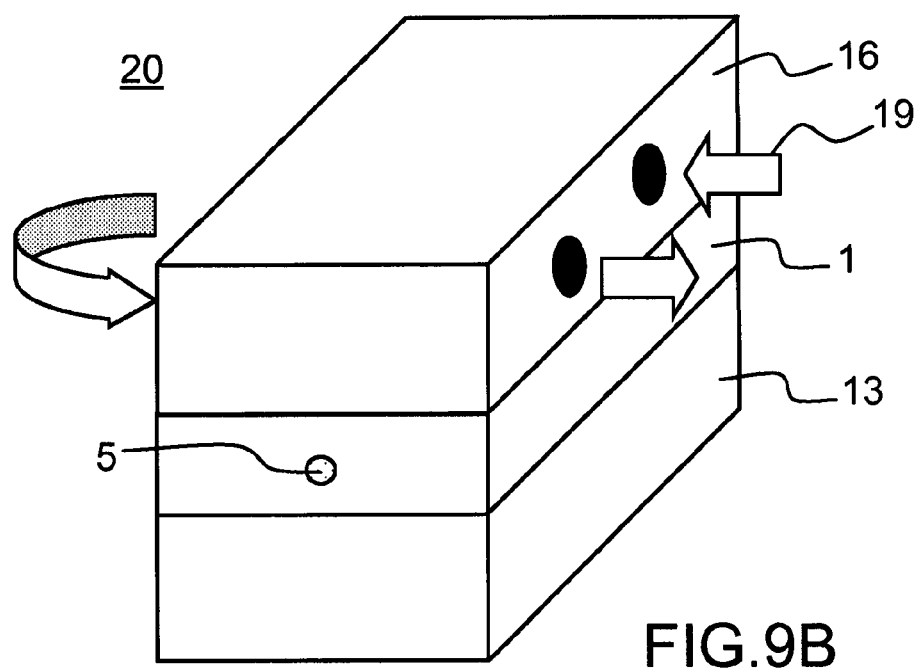

With reference to FIGS. 9A and 9B, examples of laser gain elements according to two embodiments are described. FIGS. 9A and 9B each show a laser gain element 20 comprising a laser gain module 1 according to the invention together with a mounting base 13 and a cooling block 16. According to a first embodiment shown in FIG. 9A, the cooling block comprises fins 15 together with a fan 17 in order to allow the dissipation of the heat by air. The cooling block may also only comprise the fins. The fins are preferably made of metal, and they are fixed onto the laser gain module 1. According to a second embodiment shown in FIG. 9B, the cooling block 16 comprises fluid circulation pipes 19. This fluid can be a liquid, for example water, or any other liquid coolant having a high thermal capacity. The cooling block is advantageously a metal block fixed onto the laser gain module 1. It is also possible to place a Peltier element between the laser gain module and the cooling block in order to improve the heat extraction.

Figure 10:
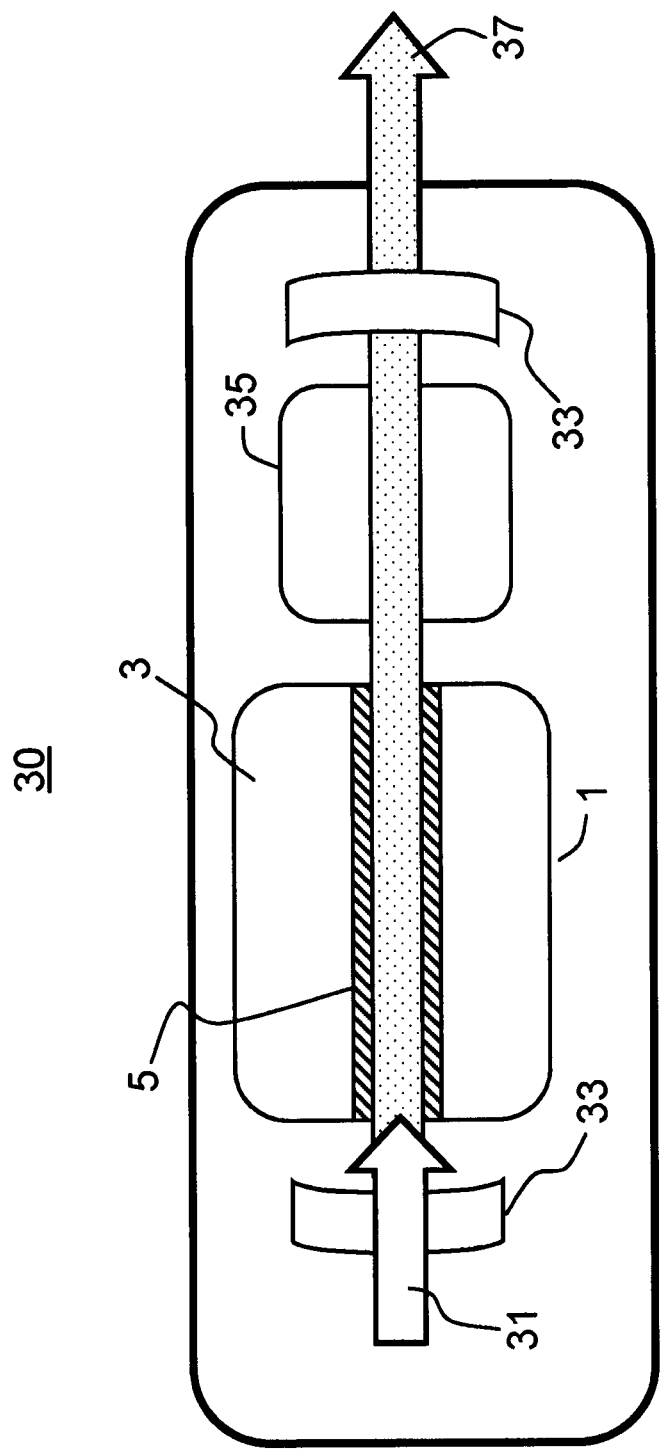
FIG. 10 shows a laser system according to one embodiment of the invention.
Figure 11:
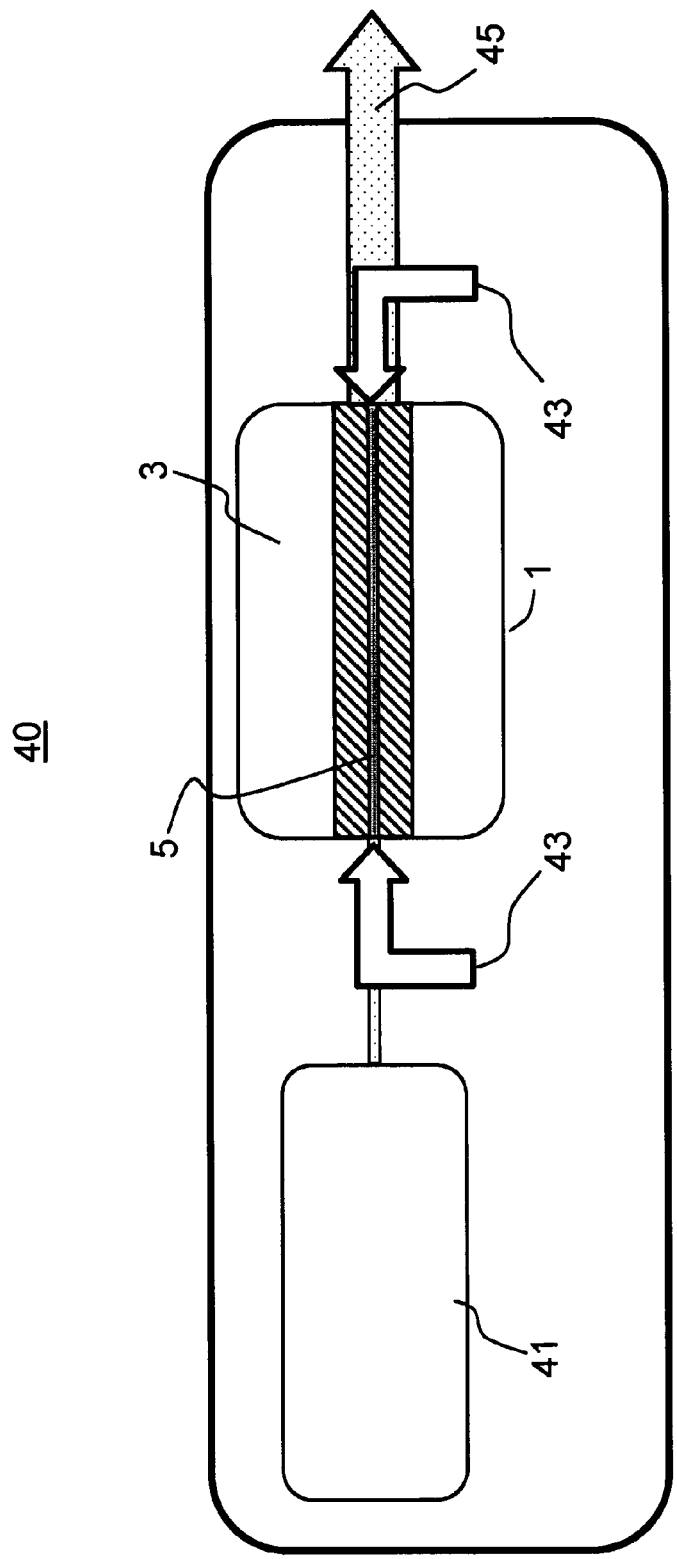
FIG. 11 shows a laser system according to another embodiment of the invention.

FIGS. 10 and 11 show laser systems according to embodiments of the invention.

FIG. 10 shows schematically a laser system 30 comprising a laser gain module 1 according to the invention with a laser rod 5 and a cooling body 3, together with a cavity formed by mirrors 33 and an optical modulator 35 allowing the laser to operate in Q-switched mode. The laser rod is pumped longitudinally by a light beam 31 in order to generate a laser beam 37.

FIG. 11 shows another example of a laser system 40 according to the invention. The system 40 comprises a laser source 41 whose radiation is amplified by a laser gain module according to the invention. The laser radiation from the laser 41 propagates within the rod 5 which is pumped longitudinally by one or more pump beams 43 entering via one or via the two optical interfaces of the rod 5. The low-power radiation from the laser 41 is thus amplified to produce a high-power output laser beam 45.

Although described through a certain number of detailed exemplary embodiments, the laser gain module and the method of fabricating a laser gain module according to the invention comprise various variants, modifications and improvements which will be apparent in an obvious manner to those skilled in the art, it being clearly understood that these various variants, modifications and improvements form part of the scope of the invention, such as defined by the claims that follow.

The invention claimed is:

1. A laser gain module comprising:
   a laser rod comprising two optical interfaces arranged opposing one another, the laser rod being intended to undergo a longitudinal or near-longitudinal optical pumping, and
   a metal cooling body at least a part of which is molded around the laser rod so as to cover all surfaces other than optical interfaces in such a manner that the laser gain module forms a non-removable solid body at room temperature.

2. The laser gain module as claimed in claim 1, wherein the metal cooling body comprises an internal part made of metal material molded around the laser rod and an external part made of metal material in contact with the internal part, a melting point of the metal material forming the internal part being lower than a melting point of the metal material forming the external part.

3. The laser gain module as claimed in claim 2, further comprising a metal adhesion layer between the internal part of the metal cooling body and the laser rod.

4. The laser gain module as claimed in claim 2, wherein the metal material forming the external part of the metal cooling body comprises an alloy containing at least one selected from the group consisting of copper, iron, zinc, aluminum, silver, gold, platinum and tin.

5. The laser gain module as claimed in claim 1, wherein the metal cooling body is formed from a single material as a single part molded around the laser rod.

6. The laser gain module as claimed in claim 5, wherein the metal material forming the cooling body is made of an alloy containing at least one selected from the group consisting of copper, iron, zinc, aluminum, silver, gold, platinum and tin.

7. The laser gain module as claimed in claim 1, wherein the laser rod comprises a crystal fiber, whose crystalline matrix is one selected from the group consisting of an oxide, a vanadate, a fluoride, and a tungstate, and comprises rare-earth or metal dopant ions.

8. The laser gain module as claimed in claim 1, wherein the optical interfaces of the laser rod are covered by a dielectric coating.

9. A laser gain element comprising:
   a laser gain module as claimed in claim 1, and
   a cooling block fixed to the laser gain module and structured for circulation of a cooling fluid.

10. A solid-state laser system comprising:
    a laser gain module as claimed in claim 1; and
    a source for emission of a pump beam intended for longitudinal or near-longitudinal pumping of the laser rod.

11. A method for fabricating a laser gain module, comprising:
    bringing into contact a laser rod with a metal compound in solid or liquid form to form a rod-metal compound assembly;
    heating the rod-metal compound assembly to a temperature at least equal to a melting point of the metal compound, allowing the metal compound to mold around the laser rod;
    cooling the rod-metal compound assembly to a temperature lower than the melting point of the metal compound in order to form a non-removable solid body at room temperature; and
    cutting and polishing the rod-metal compound assembly so as to form two optical interfaces arranged opposing one another, all surfaces other than the optical interfaces being covered by the metal compound.

12. The fabrication method as claimed in claim 11, comprising:
    depositing of the laser rod into a notch of a mounting made of metal material prior to bringing the laser rod into contact with the metal compound, the metal compound having a melting point lower than that of the metal material from which the mounting is made,
    heating of an assembly comprising the mounting, the metal compound, and the laser rod to a temperature lower than that of the melting point of the metal material from which the mounting is made, and
    cooling of the assembly in order to form said non-removable solid body at room temperature.

13. The fabrication method as claimed in claim 12, further comprising, prior to bringing the rod into contact with the metal compound:
    coating of all surfaces other than the optical interfaces of the laser rod with a metallic paint allowing adhesion of a brazing material, and drying of the metallic paint deposited onto the laser rod so as to obtain a metal adhesion layer around the laser rod.

14. The fabrication method as claimed in claim 11, comprising:

depositing of the laser rod into a crucible prior to bringing the laser rod into contact with the metal compound, heating of the crucible containing the rod-metal compound assembly to a temperature at least equal to the melting point of the metal compound, and de-molding of the rod-metal compound assembly after the cooling.

\* \* \* \* \*